United States Patent [19]

Cheng et al.

[11] Patent Number: 4,539,380
[45] Date of Patent: Sep. 3, 1985

[54] PROCESS FOR PRODUCING HOMOPOLYMERS OR COPOLYMERS OF OLEFINICALLY UNSATURATED MONOMERS

[75] Inventors: Cheng-Yi Cheng; Shou-Yuan Lee; Kwang-Ming Chen; Won-Doon Hong, all of Kao Hsiung, Taiwan

[73] Assignee: Formosa Plastics Corporation, Taipei, Taiwan

[21] Appl. No.: 513,905

[22] Filed: Jul. 14, 1983

[51] Int. Cl.$^3$ .............................................. C08F 2/00
[52] U.S. Cl. ...................................... 526/78; 526/74; 526/88; 526/344.2; 526/345
[58] Field of Search ....................................... 526/78, 88

[56] References Cited

U.S. PATENT DOCUMENTS 3,661,867  5/1972  Koyanagi et al. ................. 526/78 X
4,323,664  4/1982  Mukoyama et al. ................... 526/88

FOREIGN PATENT DOCUMENTS 2202189  7/1973  Fed. Rep. of Germany ........ 526/78
865863   4/1961  United Kingdom ................. 526/73
1047489  11/1966 United Kingdom .

OTHER PUBLICATIONS

"Colloid Chemical Studies of Polystyrene Latices Polymerized Without any Surface Active Agents", Kotera et al, Koll ZZ Polym. (1970), 239, pp. 677-681.
"Emulsifier-Free Latex", Willis, Ind. Engr. Chem., (1949), 41 pp. 2272-2276.
"A Method for Preparing Surfactant-Free Polystyrene Latices of High Surface Charge", Furusawa et al., Koll ZZ Polym (1972), 250 pp. 908-909.
"Emulsion Polymerization", D. C. Blackley, (1975), pp. 324-328.

Primary Examiner—Joseph L. Schofer
Assistant Examiner—S. Babajko
Attorney, Agent, or Firm—Burns, Doane, Swecker & Mathis

[57] ABSTRACT

The present invention relates to a polymerization process for polymerizing olefinically unsaturated monomer or monomers, wherein inorganic salts are employed to substitute for the traditional emulsifiers employed in the polymerization recipe. The polymerization of olefinically unsaturated monomer or monomers is conducted in the presence of a water soluble initiator. An electrolytic solution of inorganic salt and a buffer solution are introduced into the polymerization mixture at a particular time during reaction period to adequately adjust pH value of the reaction mixture. Further, it is essential to alter the speed of agitation during polymerization by a two-stage operation. The polymer resins so produced have no emulsifier residue contained within the polymer particles, whereby the properties of plastisols from these resins such as viscosity stability, heat stability and clarity are superior to those of the polymer resins produced by conventional emulsion polymerization process or microsuspension polymerization process. The monomer/water ratio of the polymerization recipe thereof is also improved, whereby productivity per batch or run of polymerization is increased.

16 Claims, No Drawings

PROCESS FOR PRODUCING HOMOPOLYMERS OR COPOLYMERS OF OLEFINICALLY UNSATURATED MONOMERS

BACKGROUND OF THE INVENTION

In the customary emulsion polymerization process for producing vinyl resins, water-soluble polymerization initiators are generally employed so that latex or paste of acceptable properties can be provided. On the contrary, oil-soluble polymerization initiators are employed in the microsuspension polymerization process for producing vinyl polymers or copolymers. No matter which of said processes is adopted, a large amount of emulsifier or emulsifiers must be included in the polymerization recipe. As examples of such emulsifiers may be mentioned the anionic surfactants, such as a high fatty acid soap, a sulfate of a long chain alcohol, a metallic salt of an alkyl benzene sulfonate, and the like, non-ionic surfactants, such as a glycerin ester of fatty acids, a sorbitan ester, a polyol ester of fatty acids, a polyoxyethylene compound and the like.

It has been known that the resins obtained from said emulsifier-incorporated polymerization processes will have emulsifier residue contained within the polymer particles which has adverse effects on the properties of the resins. Accordingly, when the resins are formulated into plastisol or organosol for further processing, the viscosity changes during storage are somewhat unacceptable, the heat stability thereof is undesirable, and the clarity of the products made therefrom is to be improved. In view of the adverse effects emulsifiers have on the properties of the resins, it is obvious that great advantages can be obtained if emulsifiers are deleted from the polymerization recipe. However, if the emulsifiers are not included in the recipe, the stability of colloidal particles during polymerization remains much to be improved. It is therefore an aspect of the invention to provide a polymerization process which does not incorporate emulsifiers in its polymerization recipe, yet acceptable stability of colloidal particles during polymerization is provided as well.

BRIEF DESCRIPTION OF THE INVENTION

In accordance with the instant invention, the polymerization process of olefinically unsaturated monomer or monomers is conducted through the operation of two-stage agitation in a one-charge mixture. The ingredients with a monomer/water ratio of about 0.1 to about 0.8 are charged into the polymerization reactor. The reaction mixture, including the monomer or monomers, demineralized water and water-soluble initiators, is thoroughly agitated. The polymerization system is then heated to the reaction temperature in the range of about 30° C. to about 75° C. It is preferred, however, to employ a polymerization temperature in the range of about 35° C. to about 70° C. It should be noted that if the temperature of the reaction is too high as compared to the acceptable temperature range, a large amount of polymerization colloids tend to agglomerate or coagulate and the amount of polymer buildup is increased. In another aspect of the invention, a high-speed period of agitation is employed after the polymerization initiates. In other words, a high-speed agitation is employed at the first stage of the reaction. This is because the polymerization reaction is a heterogeneous reaction and a thorough agitation is needed to increase the collision frequency between the substantially water insoluble monomers and the free radicals formed by the polymerization initiators. Efficient collisions will initiate reactions between the monomers and the free radicals, whereby nucleations of reaction are induced.

The free radicals, which are decomposed from the polymerization initiators, are electrically charged. The charges are then transferred to the nucleated particles of reaction, and the growing polymerizing particles of nucleation are thus electrically charged at the interface between the propagating polymer and water phases. At the time when the conversion achieves the range of about 5% to about 30%, an electrolytic solution with its pH value controlled in the range of about 7.5 to about 11.5 is introduced into the constantly agitated polymerization mixture. The charged polymerizing particles are surrounded by the counter ions and together form an electronic double layer around each particle so that the polymers can remain in colloidal state.

After the conversion has reached the range of about 50% to about 70%, the polymer is grown or propagated to a certain extent and the concentration of monomers is relatively lowered. If the high speed agitation of first stage is maintained thereon, the stability of the polymers will be destroyed. The polymers so far formed will coagulate precipitate or form undesirable polymer buildup. Moreover, the high speed agitation unduly prolonged will cause termination reaction of the free radicals, the polymers being unable to grow or propagate, and the nucleations of reaction will transfer to the dilute monomers in the water which react to form undesirable newly-initiated particles at the end period of the reaction. To avoid these undesirable phenomena, the agitation speed should be reduced at this point (which is called the second stage agitation hereinafter). The preferred second stage agitation speed has been found to be about ⅓ to about 1/6 of the first stage speed (initial speed).

DETAILED DESCRIPTION

In the present invention, "olefinically unsaturated monomer" refers to vinyl halides, such as vinyl chloride, and the like; ethylene halides, such as ethylene bromide, and the like; vinylidene halides, such as vinylidene chloride, and the like; vinyl esters, such as vinyl acetate, and the like; nitriles, such as acrylonitrile, and the like; and other oil-soluble olefinic monomers of the types known to those skilled in the art. The invention can be applied for producing homopolymers of one of said olefinic monomers, it can also be applied for producing copolymers of at least two of said olefinic monomers. It is, however, preferable to employ polar monomers which are slightly water-soluble. It has been found that as the water-solubility of the oil-soluble monomer is equal to or greater than 0.2%, the capability of forming nucleations of reaction increases.

The preferred monomer/water ratio of the instant invention is in the range of about 0.1 to about 0.8. It should be noted that if the polymerization conditions are not strictly maintained, that is to say, a buffer solution is not adopted in the recipe to adjust the pH value of the reaction mixture to the range of about 7.5 to about 11.5, or the speed of agitation is not kept at the correct initial speed and subsequently altered to the preferable second stage speed at due time, or the electrolytic solution is not introduced at the correct instant, the colloidal state of the reaction mixture will become unstable and it will be needed to reduce the monomer/- water ratio to the range of about 0.05 to about 0.1 so that the reaction mixture may still have adequate stability. On the contrary, if the polymerization conditions are strictly maintained in accordance to the process of the invention, the monomer/water ratio may be increased to the range of about 0.1 to about 0.8, which is another aspect of the present invention.

In the present invention the initiators are water-soluble compounds, such as hydrogen peroxide, persulfates of alkali metals; or water-soluble reductants either contain or not contain ammonium ion in their structures, such as sulfites or bisulfites of alkali metals. The amount of the initiators are employed in a range of about 0.05% to about 0.4% by weight, based on the weight of the monomer or monomers. The preferred type of initiators are those compounds which contain sulfate group ($SO_4^{--}$), carboxyl group ($COO^-$), or hydroxyl group ($OH^-$) in their structures. As examples of such initiators may be mentioned $K_2S_2O_8$, $K_2S_2O_5$, $K_2S_2O_3$, $NaHSO_3$, $H_2O_2$, and the like. When incorporated in the polymerization recipe, the initiators decompose into electrically charged free radicals, the propagating polymer formed thereby contain the charged group at its terminal or terminals, the terminal or terminals of each polymer in the nucleated cells of reaction face(s) outwardly, and together with the ions of the electrolyte in the water form an electronic double layer around each particle of nucleation, whereby coagulation or agglomeration is prevented and a stable colloid in suspension is thus provided.

In order to promote uniform decomposition of the initiators and to stabilize the polymerization mixture at adequate reaction temperature, a small amount of oxidant or oxidants may be incorporated in the polymerization recipe. The acceptable oxidants are salts of transition elements (metals), such as nitrates, chlorates, bromates or sulfates of Fe, Cu, Zn, Ce, Sn, Co and V etc. The preferred amount of such oxidant or oxidants added is about 0.1 to about 10 times of the moles of the initiators added. However, the employment of such oxidants should take into consideration the concentrations and types of the initiators incorporated in the polymerization recipe and should not interfere with the reaction thereof, otherwise the stability of the polymerizing colloid would be destroyed.

The colloid stabilizers employed in the invention are those water-soluble inorganic salts such as hydroxides, chlorides, carbonates, bicarbonates, phosphates, or nitrates of IA, IIA, or IIIA group elements in periodic table. The best amount of stabilizer(s) depends mainly upon the ionic strength of the entire reaction mixture and should maintain a good balance with the initiators and oxidants employed. A range of about 0.01% to about 0.5% by weight, based on the weight of the monomer or monomers, is preferred.

In the practice of the invention, a buffer solution which can maintain the reaction mixture in a preferred range of pH about 7.5 to about 11.5 is also introduced into the recipe during the polymerization process. As long as it can maintain pH value of the reaction system within said given range, any type of buffer solutions such as $NH_3/NaOH$, $NaHCO_3/NaOH$, or $Na_3PO_4/Na_2HPO_4$ may be employed. The only restriction about the amount of the buffer solution is to be sufficient to maintain pH value in the range of about 7.5 to about 11.5. With the aid of an adequate buffer solution, the terminal groups of the propagating polymers may thus carry sufficient negative charges in basic environment throughout the polymerization process.

To further illustrate the process of the present invention, the following specific examples about the polymerization process of vinyl chloride are given, it being understood that this is merely intended in an illustrative and not a limitative sense.

EMBODIMENT 1

A mixture of 0.5 gm $K_2S_2O_8$ and 500 c.c. demineralized water was charged into a 1 liter capacity polymerization vessel (or reactor). The vessel was then closed tightly and evacuated to $-740$ mmHg. 100 c.c. of vinyl chloride was added therein and the system was stirred at an agitation speed of 600 rpm. The mixture was heated to a reaction temperature of 52° C. for half an hour. Then a premix of electrolytic solution (0.04 gm $CaCO_3$+0.8 gm 25% $NH_3/NaOH$ solution) was introduced into the reaction vessel. After about 2.5 hours the speed of agitation was reduced to 100 rpm. The reaction was continued till the pressure drop reached 2 $Kg/cm^2$. Stable polymers with particle size in the range of about 0.4 micron to about 1.5 microns were obtained. And the polymer buildup was about 0.1% of the charge stock.

COMPARISON EXAMPLE 1

The polymerization reaction was repeated as that of the foregoing embodiment 1 with the speed of agitation being maintained at 600 rpm until the reaction pressure drop had reached 2 $Kg/cm^2$. The polymer buildup weighted about 30% of the charge stock and the polymers are small particles with size in the range of about 0.2 to 0.7 micron.

COMPARISON EXAMPLE 2

The electrolytic solution and buffer solution were introduced into the polymerization mixture after it had reacted for 2.5 hours, and other polymerization conditions were kept under the same as those of Embodiment 1. The polymer buildup weighed about 12% of the charge stock and the polymer particle size was in the range of about 0.2 to 1.5 microns.

COMPARISON EXAMPLE 3

The pH value of the polymerization mixture was controlled in a range of 3.5 to 4.0, and other polymerization conditions were kept under the same as those of Embodiment 1. The polymer buildup weighed about 25% of the charge stock and the polymer particle size was in the range of about 0.2 to 1.4 microns.

COMPARISON EXAMPLE 4

The polymerization mixture was controlled at a pH value of 13, and other polymerization conditions were kept under the same as those of Embodiment 1. The reaction time was longer and no pressure drop was observed in the system. It was apparent that once the reaction mixture became too basic, the initiator $K_2S_2O_8$ would be incapable of initiating the reaction and the reaction would not be complete as well. The polymer particle size was in the range of about 0.2 to 0.9 micron and the polymer buildup weighted about 8% of the charge stock.

The results with respect to the runs of the Embodiment and Comparison Examples are shown in the following table:

TABLE I

| Run No. | Particle size (micron) | Polymer buildup | Polymer Stability |
|---|---|---|---|
| Embodiment 1 | 0.4~1.5 | 0.1% | good |
| Comparison Example 1 | 0.2~0.7 | 30% | not acceptable |
| Comparison Example 2 | 0.2~1.5 | 12% | not acceptable |
| Comparison Example 3 | 0.2~1.4 | 25% | not acceptable |
| Comparison Example 4 | 0.2~0.9 | 8% | not acceptable |

It can be seen from the run of Comparison Example 1 that if the method of two-stage agitation, i.e. high speed of agitation at the first stage of reaction and lower speed of agitation at the second stage, were not adopted, the propagating polymers would be unstable in the system. From the results of Comparison Example 2, it is apparent that the solution of electrolytic stabilizer should be introduced into the polymerization mixture at the correct step of reaction so that a stable reaction mixture can be formed. The runs of Comparison Example 3 and 4 clearly show that pH value of the polymerization mixture should be controlled within a preferred range. An out-of-control condition, whether it's too acidic or too basic, would form an unacceptable polymerization environment and the influence thereof would be unstable polymers and increased polymer buildup.

In addition to the polymerization process described hereinabove, another advantage of the instant invention resides in the superior properties of the resins produced by the present process. Comparison will be made between the polymerized resins produced by the present invention and those resins made from conventional emulsion polymerization process and microsuspension polymerization process.

EMBODIMENT 2

A mixture of 1.2 gm $K_2S_2O_8$ and 8 liter demineralized water was charged into a 20 liter capacity polymerization vessel. The vessel was then closed tightly and evacuated to −740 mmHg. 2 liters of vinyl chloride was added therein. The agitator was started and the system was stirred at a speed of 650 rpm for 15 minutes. The mixture was then heated to a reaction temperature of 52° C. for half an hour. Then a premix of electrolytic solution, which contained 16 gm $NH_3$/NaOH 25% solution+0.01 gm $CaCl_2$+4 gm $CaCO_3$, was introduced into the reaction vessel. After about 2.5 hours the speed of agitation was reduced to 200 rpm and the reaction continued until the pressure drop reached 2 $Kg/cm^2$. The particle size of the PVC resins from the run was in the range of about 0.4 to 1.5 microns.

COMPARISON EXAMPLE 5

Microsuspension Polymerization

A charge including 8 liter demineralized water, 2.5 gm 2-4-dimethyl-2-2'-azo-bis-valeronitrile, 24 gm sodium dodecylsulfate, 36 gm hexadecanol, and 12 gm stearic acid was introduced into a 20 liter capacity polymerization vessel. The vessel was then closed tightly and evacuated to −740 mmHg. 4.5 liters of vinyl chloride was added therein and the system was agitated for 15 minutes. Then the mixture was thoroughly homogenized with a homogenizer and heated to a reaction temperature of 52° C. The reaction was conducted until the pressure drop reached 2 $Kg/cm^2$. A latex with particle size in the range of about 0.2 to 2.0 microns was produced from the run.

COMPARISON EXAMPLE 6

Emulsion Polymerization

A charge including 6 liter demineralized water, 2.5 gm $K_2S_2O_8$, 10 gm sodium dodecylbenzenesulfonate, 18 gm stearic acid, and 20 gm hexadecanol was introduced into a 20 liter capacity polymerization vessel. The vessel was then closed tightly and evacuated to −740 mmHg. 4.5 liters of vinyl chloride was added therein and the system was agitated for 15 minutes. The mixture was heated to a reaction temperature of 50° C. 2 liters of 0.6% sodium dodecylbenzenesulfonate was added continuously into the reaction mixture at a flowrate of 0.4 liter/hour. And the reaction was conducted until the pressure drop reached 2 $Kg/cm^2$. A latex with particle size in the range of 0.2 to 1.4 microns was produced from the run.

Each polymer latex or slurry of the above three processes was removed from the reactor and spraydried to recover the dry PVC or resin. Comparison was made between the properties of the polymer from each run for evaluation purposes. Pertinent data with respect to the properties are given in the following table:

TABLE II

| Properties | | Process No. | | |
|---|---|---|---|---|
| | | Embodiment 2 | Comparison Example 5 | Comparison Example 6 |
| Heat Stability (minutes at 220° C. till blackening) | | 3 | 2.0 | 2.5 |
| Clarity | | Excellent | Good | Good |
| Viscosity (cps · measured after plastisol been prepared for | 1 day | 5080 | 4980 | 4890 |
| | 4 days | 5100 | 6300 | 6160 |
| | 7 days | 5200 | 7800 | 6940 |
| | 8 days | 5200 | 8460 | 7980 |

The data shown in TABLE II was obtained from the following test procedures:

(1) Test procedure for heat stability:

In order to determine the heat stability, plastisols were made with the resin or polyvinyl chloride (PVC) of each run using the following recipe:

| PVC resin | 100 PHR[a] |
|---|---|
| Dioctyl phthalate | 80 PHR |
| $CaCO_3$ | 10 PHR |
| Epoxidized soybean oil | 3 PHR |
| Ba—Zn liquid stabilizer | 2 PHR |

[a]PHR: parts per hundred parts resin

Films having a 0.2 mm thickness were made from the plastisols and were heated at a gel point of 190° C. for 1 minute. The film of each run was cut in pieces and put into an ageing oven with an oven temperature of 220° C. One of the test-pieces was taken out of the oven every 30 seconds. Color degradation of the test-pieces of each run were compared and the ageing times till blackening (in minutes) were recorded.

(2) Test procedure for Clarity:

The following recipes were prepared:

| PVC resin | 100 PHR |
|---|---|

| | |
|---|---|
| Dioctyl phthalate | 80 PHR |
| Organo-tin stabilizer | 1 PHR |

Film having a thickness of 0.2 mm was made from PVC resin of each run according to the recipe and was heated for 3 minutes at 190° C. The film was then put on a glass plate and observed for its clarity under a standard illuminant. As to clarity comparison: An "excellent" test-piece implied its clarity was better than a "good" test-piece.

(3) Test procedure for viscosity measurements after plastisol preparations:

Plastisols were made with the PVC resin of each run using the following recipe:

| | |
|---|---|
| PVC resin | 100 PHR |
| Dioctyl phthalate | 70 PHR |
| Dioctyl adipate | 10 PHR |
| $CaCO_3$ | 10 PHR |

Viscosity values were derived from viscosity measurements using a Brookfield Model B Viscometer. The viscosity was measured in centipoises (cps.) at a temperature of 25° C. after each plastisol had been prepared for x day or days (as indicated in TABLE II).

The improved properties in the products of the instant invention can be seen from the above results. Among the many advantages of the present invention is the fact that the resin properties are greatly improved, and, more importantly, the productivity per batch or run of polymerization is increased because the monomer/water ratio can be improved by the process of the invention.

While the present invention has been described in reference to its specific embodiments, it will be apparent to those skilled in the art that various modifications can be made without departing from the spirit and scope of the invention. Accordingly, it is not intended that the invention be limited by those illustrative descriptions, except as by the appended claims.

We claim:

1. A process for producing polymers of oil-soluble olefinic monomer(s) and copolymers thereof, characterized by comprising the steps of in an aqueous media conducting an emulsion polyermization of soil-soluble olefinic monomer in the absence of emulsifiers and in the presence of a water-soluble initiator and at a polymerization reaction temperature of about 30° C. to about 75° C., introducing an electrolytic solution of water-soluble inorganic salts and a buffer solution into the polymerization mixture only when the conversion of the reaction reaches about 5% to about 30% to adjust the pH value of the reaction mixture to the range of about 7.5 to about 11.5, and applying a two-stage alteration of the speed of agitation, the speed of agitation being altered from a first higher speed range during initiation of the polymerization to a second lower speed range after initiation and during polymerization to maintain stability of the colloidal state of the polymerization mixture, whereby polymer resins having no emulsifier residue contained within the polymer particles and having improved properties are produced.

2. A process as defined in claim 1 wherein the monomer/water ratio of the polymerization mixture is in the range of about 0.1 to about 0.8.

3. A process as defined in claim 1 wherein from about 0.01% to about 0.5% by weight, based on the weight of the monomer(s), of said inorganic salt is employed; said inorganic salt being a compound made from an element of group IA, IIA, or IIIA and an element of group VII in periodic table, or being a hydroxide, phosphate, carbonate, bicarbonate, or nitrate of a IA, IIA or IIIA element.

4. A process as defined in claim 1 wherein from about 0.05% to about 0.4% by weight, based on the weight of the monomer(s), of said initiator is employed; said initiator being a water-soluble compound which decompose to form a sulfate radical, hydroxyl group or carboxyl group in the polymerization mixture, or being a water-soluble reductant either containing or not containing ammonium ion in its structure.

5. A process as defined in claim 1 wherein at least a small amount of buffer solution is employed to maintain pH value of the reaction mixture in the range of about 7.5 to about 11.5; said buffer solution being one of the adequate buffer solutions selected from the group consisting of ammonia/sodium hydroxide, sodium phosphate/disodium hydrogen phosphate, sodium carbonate/sodium bicarbonate, and sodium bicarbonate/sodium hydroxide.

6. A process as defined in claim 1 wherein a two-stage alteration of the speed of agitation is applied to the polymerization system, characterized by employing a high speed of agitation in the initial period of reaction, reducing the speed of agitation to a lower speed when the conversion of reaction reaches about 50% to about 70%, said initial speed of agitation being in the range of about 500 rpm to about 800 rpm and said second stage speed of agitation being about ⅓ to about 1/6 of said initial speed.

7. A process as defined in claim 1 wherein the monomer is a vinyl halide, vinylidene halide, a vinyl ester, or acrylonitrile.

8. A process as defined in claim 7 wherein said monomer is a mixture of monomers of the monomers claimed in claim 7.

9. A process for producing a polymer or copolymer of at least one oil-soluble olefinic monomer, comprising
 initiating in a reaction vessel at a polymerization reaction temperature of about 30° C. to about 75° C. an emulsion polymerization of the oil-soluble olefinic monomer in the absence of emulsifiers and in the presence of a water-soluble initiator and while agitating at a first agitation speed range sufficient to increase collision frequency between the monomer and free-radicals formed by the polymerization initiators,
 introducing an electrolytic solution of at least one water-soluble inorganic salt and a buffer into the emulsion in the reaction vessel only when the conversion of the reaction reaches about 5% to about 30% to adjust pH of the emulsion to a range of about 7.5 to about 11.5 while maintaining agitation at the first agitation speed range to maintain the polymer in a stable colloidal state,
 reducing the speed of agitation of the emulsion in the reaction vessel when conversion of reaction reaches about 50% to about 70% to a second speed range sufficient to maintain stability of the colloidal state of the reaction mixture and whereby polymer resin product having essentially no emulsifier residue contained within the polymer particles and having improved clarity, heat stability and viscosity stability properties are produced.

10. A process as defined in claim 9 wherein the monomer/water ratio of the polymerization mixture is in the range of about 0.1 to about 0.8.

11. A process as defined in claim 9 wherein from about 0.01% to about 0.5% by weight, based on the weight of the monomer(s), of said inorganic salt is employed; said inorganic salt being a compound made from an element of group IA, IIA, or IIIA and an element of group VII in periodic table, or being a hydroxide, phosphate, carbonate, bicarbonate, or nitrate of a IA, IIA or IIIA element.

12. A process as defined in claim 9 wherein from about 0.05% to about 0.4% by weight, based on the weight of the monomer(s), of said initiator is employed; said initiator being a water-soluble compond which decompose to form a sulfate radical, hydroxyl group or carboxyl group in the polymerization mixture, or being a water-soluble reductant either containing or not containing ammonium ion in its structure.

13. A process as defined in claim 9 wherein at least a small amount of buffer solution is employed to maintain the pH value of the reaction mixture in the range of about 7.5 to about 11.5; said buffer solution being one of the buffer solutions selected from the group consisting of ammonia/sodium hydroxide, sodium phosphate/disodium hydrogen phosphate, sodium carbonate/sodium bicarbonate, and sodium bicarbonate/sodium hydroxide.

14. A process as defined in claim 9 wherein a two-stage alteration of the speed of agitation is applied to the polymerization system, characterized by employing a high speed of agitation in the initial period of reaction, reducing the speed of agitation to a lower speed when the conversion of reaction reaches about 50% to about 70%, said initial speed of agitation being in the range of about 500 rpm to about 800 rpm and said second stage speed of agitation being about $\frac{1}{3}$ to about 1/6 of said initial speed.

15. A process as defined in claim 9 wherein the monomer is a vinyl halide, vinylidene halide, a vinyl ester, or acrylonitrile.

16. A process as defined in claim 9 wherein said monomer is a mixture of monomers of the monomers claimed in claim 9.

* * * * *